April 3, 1945.  H. B. HOLTHOUSE  2,372,897

HEATING AND VENTILATING SYSTEM

Filed June 11, 1942  3 Sheets-Sheet 1

Inventor:
Harry B. Holthouse
By: Forman L. Mueller
Att'y.

April 3, 1945.  H. B. HOLTHOUSE  2,372,897
HEATING AND VENTILATING SYSTEM
Filed June 11, 1942  3 Sheets-Sheet 3
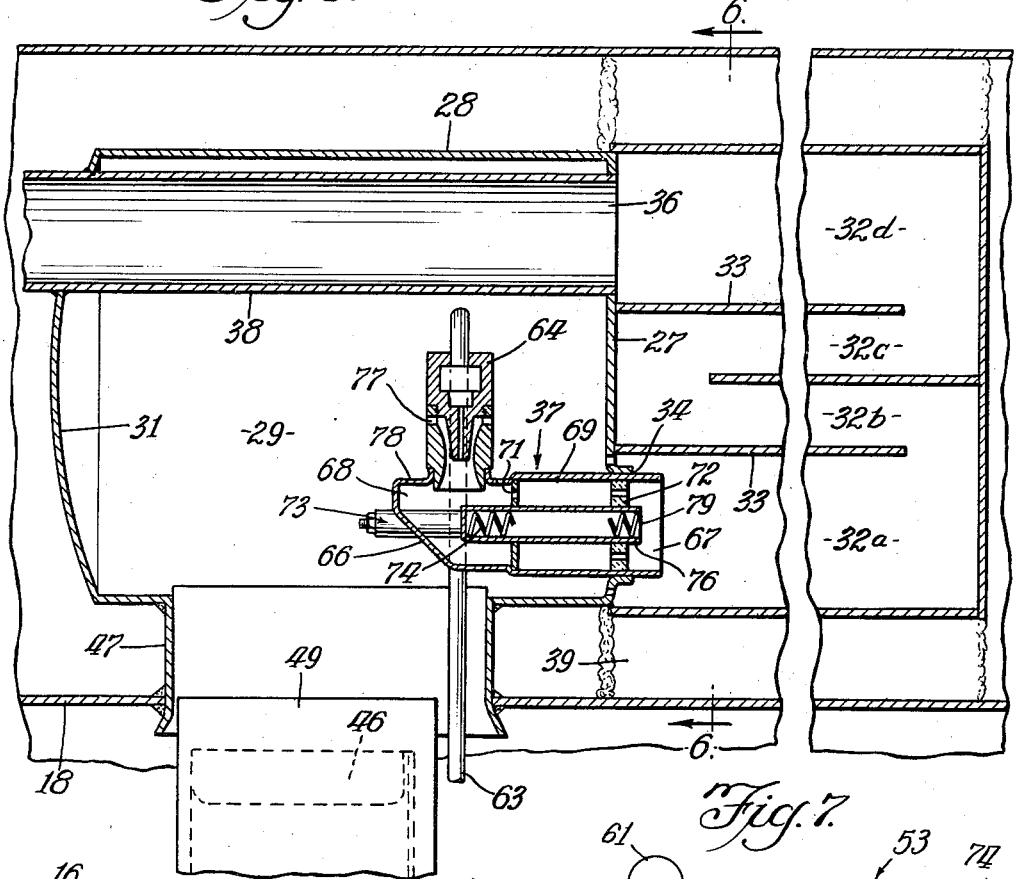
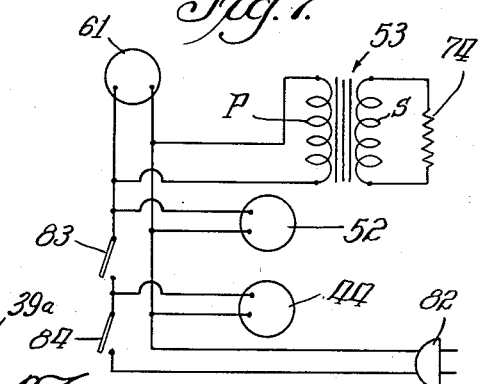
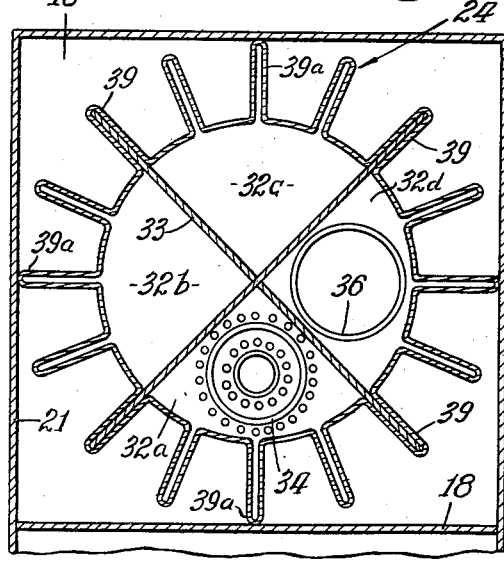
Inventor:
Harry B. Holthouse
By: Foorman L. Mueller
Atty.

Patented Apr. 3, 1945

2,372,897

UNITED STATES PATENT OFFICE 2,372,897

HEATING AND VENTILATING SYSTEM

Harry B. Holthouse, Chicago, Ill., assignor to Galvin Manufacturing Corporation, Chicago, Ill., a corporation of Illinois Application June 11, 1942, Serial No. 446,639

11 Claims. (Cl. 237—30)

This invention relates generally to air heating and ventilating systems and in particular to a system for heating and ventilating the compartment or space in a mobile craft such as a trailer or the like.

The prior art heating and ventilating systems for trailer vehicles are generally unsatisfactory because of their bulk and location within the trailer and the difficulties usually encountered in their proper installation on the trailer. Many of these prior art heaters require frequent attention during their operation, provide a dangerous fire hazard, and in operating produce disagreeable odors which often times pass directly into the trailer. Further these heating units generally produce an intense local heat so that all portions of the trailer compartment are not uniformly and comfortably heated.

It is an object of this invention, therefore, to provide an improved heating and ventilating system for a trailer vehicle.

Another object of this invention is to provide an air conditioning system for a space within a mobile craft which is located substantially entirely outside of the space to be air conditioned and in a position which is readily accessible but removed from the normal traffic about and within the trailer.

Yet another object of this invention is to provide an improved heating and ventilating system for a trailer vehicle which is of a simple and rugged construction, readily adapted to provide either heating or ventilating or a combination of heating and ventilating, is capable of being operated by merely connecting the same to a source of electrical energy, and which is adapted for efficient operation over a prolonged period of time with a minimum of servicing and attention.

A feature of this invention is found in the provision of a heating and ventilating system for a trailer vehicle having a heating unit located entirely to the outside of the trailer and in an air duct carried thereon. The air duct is in fluid communication with the trailer space and provided with an opening therein for exhausting recirculated air to the atmosphere. Damper or louver means operatively associated with such opening are adapted to be completely air sealed when in a closed position to provide an air tight heating system for the trailer.

Further objects, features, and advantages of this invention will become apparent from the following description when taken in connection with the accompanying drawings in which:

Fig. 5 is an enlarged fragmentary sectional view taken approximately along the line 5—5 in Fig. 2 showing the assembly relation of the air and fuel feeding means with the combustion chamber of the heating unit;

Fig. 6 is a transverse sectional view of the combustion chamber as seen along the line 6—6 in Fig. 5; and Fig. 7 is a control circuit for the heating and ventilating system.

Figure 1:
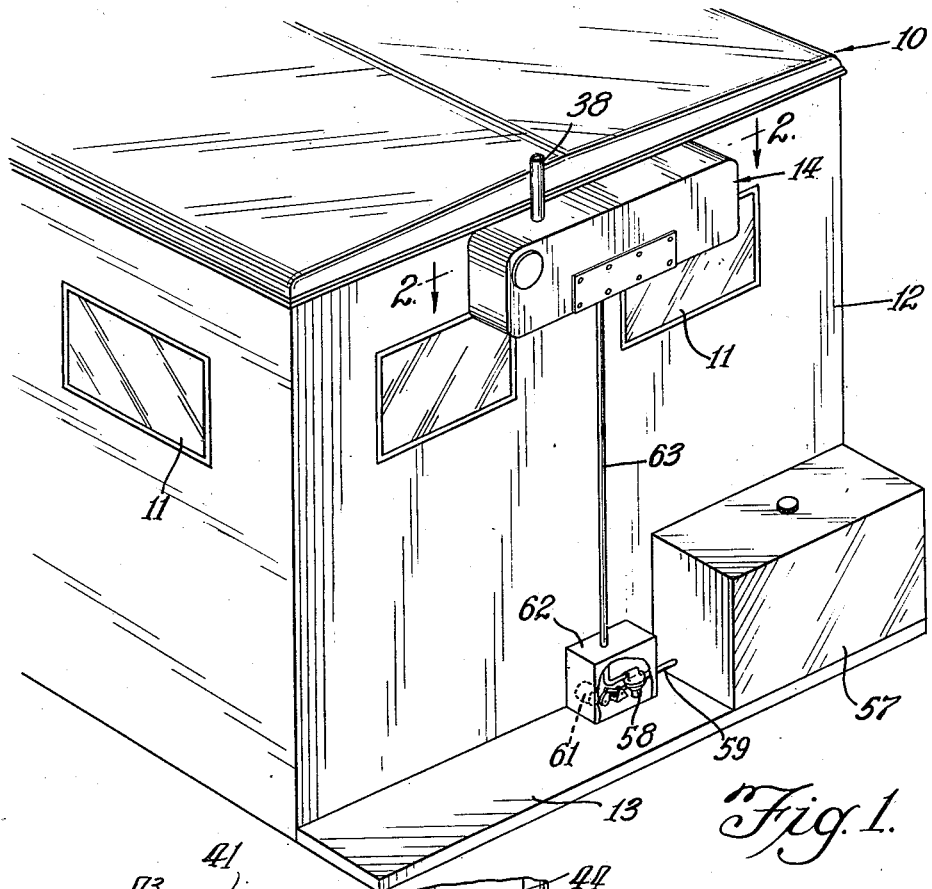
Fig. 1 illustrates the heating and ventilating system of this invention in assembly relation with a trailer vehicle.

In practicing this invention there is provided a heating and ventilating system which is adapted to be completely supported from one wall of a mobile craft illustrated in the drawings as a trailer vehicle. The heating unit in the system is of internal combustion type and is completely self-contained and of a compact structure, with all of the component parts thereof located in a single housing but readily accessible for assembly and servicing purposes. A passage for air to be heated is arranged in the housing in thermal relation with a combustion chamber and has the inlet and outlet thereof in fluid communication with the space to be heated. Located within such space and at the passage inlet is an air moving means for circulating air through the passage. Also in fluid communication with the passage inlet is an exhaust opening to the atmosphere for exhausting recirculated air from the passage, with such opening being operatively associated with adjustable louvers. Damper means operatively associated with the passage outlet control the flow of recirculated air into the trailer space and is adapted to be operated relative to the louvers for the exhaust opening to provide varied air conditions in the trailer space as will be more fully explained in the following detailed description.

Figure 2:
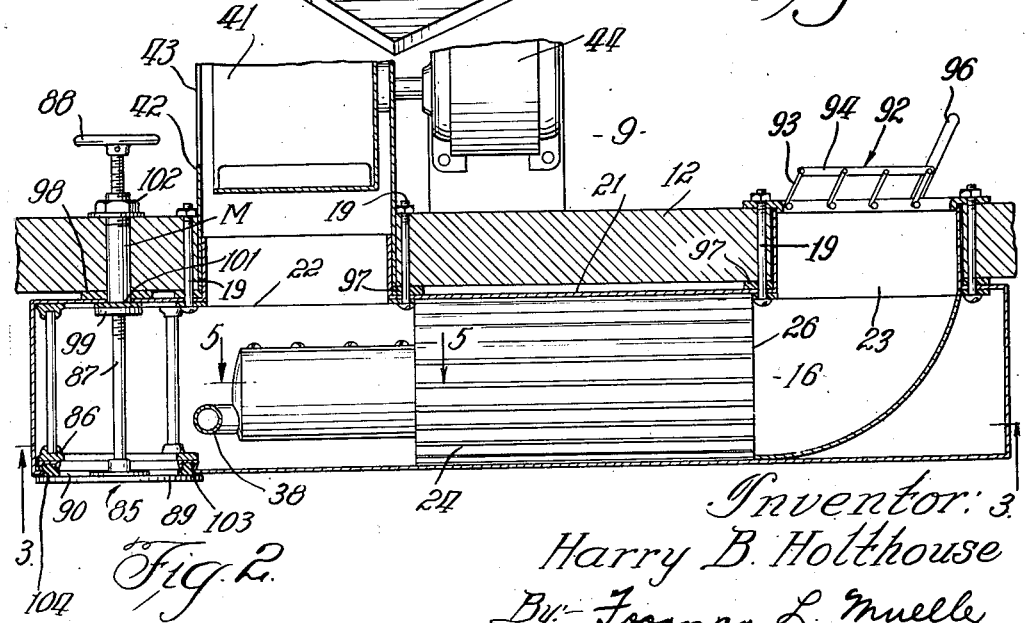
Fig. 2 is a longitudinal sectional view of the heating and ventilating system as seen along the line 2—2 in Fig. 1.
Figure 3:
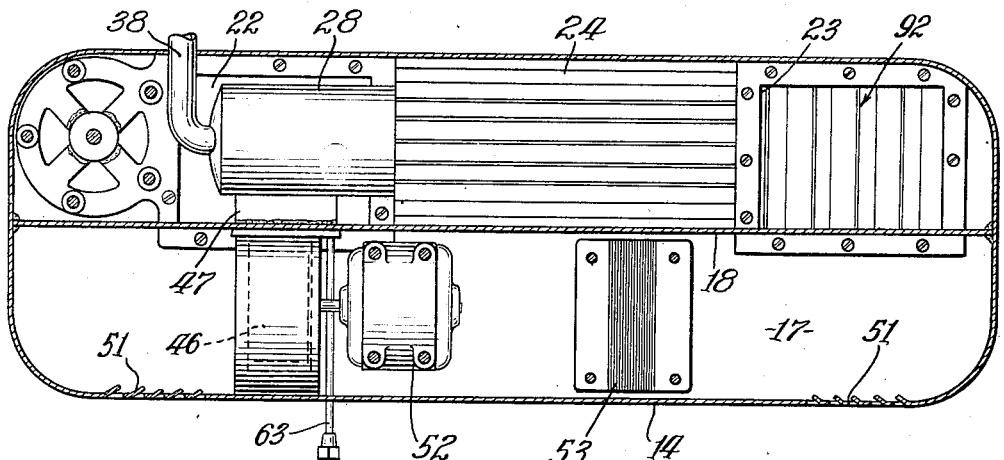
Fig. 3 is an elevational view partly in section taken along the line 3—3 in Fig. 2.
Figure 4:
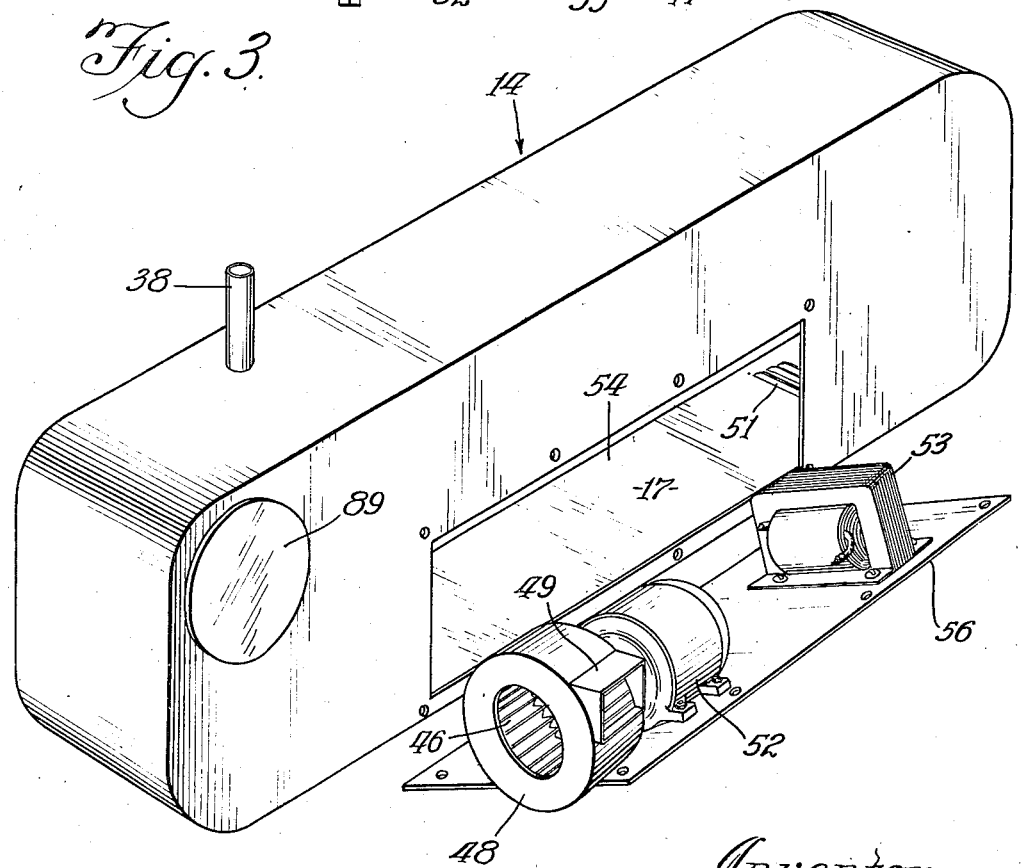
Fig. 4 is an exploded view in perspective showing the assembly of the housing for the system with the fan and motor utilized in supplying air for combustion to the heating unit therefor.

Referring to the drawings the invention is illustrated in Figs. 1 and 2 as applied to heating and ventilating the space 9 within a trailer 10 provided with usual windows 11 and including a back wall 12 with a rear step or platform 13 at the bottom thereof. The heating of the space 9 in the trailer is accomplished by a heating unit of internal combustion type including housing means 14 of substantially rectangular shape divided longitudinally thereof into two compartments or air ducts 16 and 17 by a transverse longitudinally extending partition member 18 (Figs. 2, 3 and 4). The housing 14 is secured to the back wall 12 near the top thereof by securing means 19 extended through the back wall 12 and the housing side 21 which defines in part the air duct 16, which has an inlet 22 and an outlet 23 at opposite ends thereof in fluid communication with the trailer space 9.

Located in the air duct 16 is a substantially cylindrically shaped combustion chamber 24 (Figs. 2, 5 and 6) which is closed at one end 26 by a suitable cover plate and at its opposite end by one end 27 of a cylindrical member 28 which defines an air supply chamber 29. The member 28 is closed at the other end thereof by a cover member 31. From a consideration of Figs. 2 and 3 it is seen that the combustion chamber 24 and cylindrical member 28 are in axial alignment and extend longitudinally of the air duct 16.

The combustion chamber 24 (Figs. 5 and 6) is divided longitudinally thereof into four axially extending but connected passages 32a—32d by a partition member 33 of substantially X-shape. The combustion chamber inlet 34 and outlet 36 are formed in the end 27 of the cylindrical member 28 and are in communication with the passages 32a and 32d, respectively. Located within the inlet 34 is an air and fuel mixing unit, indicated generally at 37, which is extended within the air supply chamber 29. The outlet 36 is provided with a tail pipe 38 extended through the air supply chamber and outwardly from the housing 14 at the top thereof (Figs. 1 and 4).

The outer wall or body portion of the combustion chamber 24 is provided with angularly spaced axially extending fins 39. Certain of these fins, indicated as 39a, are in engagement with the walls of the air duct 16, which include the housing side 21 and partition member 18, and space the combustion chamber from such walls to form a passage thereabout for the air to be heated. The air to be heated is admitted into the duct 16 at the inlet 22 and is circulated therethrough by a fan 41 supported on the inside of the trailer wall 12. An electric motor 44 also supported on the wall 12 is operatively associated with the fan 41 to drive the same. The fan 41 thus operates to circulate air from within the trailer space 9 through the inlet 22 and about the combustion chamber 24 to heat the same, the heated air being returned into the trailer space through the outlet 23 of the duct 16.

The air supply chamber 29 receives air from a fan 46 (Figs. 3 and 5) located within the air duct 17 and in fluid communication with the air supply chamber 29 through a connecting passage 47 carried on the partition member 18. A casing 48 for the fan 46 (Fig. 4) is provided with a mouth portion 49 adapted to be received within the connecting passage 47. The fan 46 supplies atmospheric air to the chamber 29 which is admitted into the air duct 17 through vents or openings 51 in the housing 14. An electric motor 52 also located within the air duct 17 is operatively connected with the fan 46 to drive the same.

As shown in Fig. 4, the housing 14 at the air duct 17 is formed with a substantially rectangularly shaped opening 54 and a corresponding cover plate 56. The motor and fan assembly 46—52, and a transformer 53 to be later noted, are supported on one side of the cover 56, with the opening 54 being adapted to receive the same in the air duct 17 when the cover is in a closing position. The entire cover assembly is thus a preassembled unit which is completely accessible for inspection or servicing merely on removal of the cover 56 from the housing 14. As was previously mentioned, the mouth 49 on the fan casing 48 is inserted within the connecting member 47 so that the fan 46 is completely assembled in fluid communication with the air supply chamber 29 simply by inserting the mouth 49 within the member 47. On completion of this inserting operation, the cover assembly is retained in a fixed position on the housing 14 by securing screws or the like.

Fuel for burning in the combustion chamber 24 is supplied from a fuel tank 57 carried on the trailer platform 13 and fluid connected with a pump 58, illustrated as of a diaphragm type, through a pipe connection 59 (Fig. 1). The pump 58 is operatively connected with a motor 61, the pump 58 and the motor 61 assembly being enclosed within a housing 62 carried on the platform 13 adjacent the fuel tank 57. The location of the pump adjacent the tank 57 provides for a substantially gravity feed thereto from the tank so as to eliminate any suction lift to the pump. Fuel from the pump is delivered through a line 63 to a fuel injection nozzle 64 formed as a part of the air and fuel mixing means 37 (Fig. 5).

The air and fuel mixing means 37 includes a casing member 66 which is closed at one end and open at the end 67 thereof to the passage 32a. A mixing chamber 68 located at the closed end of the casing 66 is separated from an equalizing chamber 69 by a perforated plate member 71. The equalizing chamber 69 in turn is both defined and separated from the combustion chamber passage 32a by a perforated heat insulating plate 72 spaced inwardly from the end 67 of the casing 66. Extended substantially axially through the casing 66 and supported in the partition plates 71 and 72 and projecting outwardly from the closed end of the casing 66 is a combination electric heating and igniting unit 73 which includes a resistance coil 74 supported in a spaced relation within a metal tube 76.

In the operation of the air and fuel mixing means 37 the fuel delivered to the nozzle 64 by the pump 58 is directed into the mixing chamber 68, the fuel nozzle being located within the air supply chamber 29 and mounted directly on the casing 66 at the mixing chamber 68. A portion of the air for mixing with the fuel enters the nozzle 64 from the air chamber 29 through ports 77 in the fuel nozzle and travels with the fuel into the mixing chamber 68. Additional air from the air chamber 29 is admitted directly into the mixing chamber 68 through apertures 78 formed in the casing 66 about the fuel injection nozzle 64. The fuel within the mixing chamber 68 is heated to at least a fuel vaporizing temperature by the combination unit 73 to facilitate its thorough mixing with the air. The casing 66, partition plate 71 and tube 76 are provided in a heat conducting material so as to readily receive and conduct the heat radiated and conducted thereto from the resistance coil 74. The vaporous air and fuel mixture passes through the perforated plate 71 into the equalizing chamber 69 which in cooperation with the perforated insulating plate 72 acts to reduce the turbulence in the mixture and to disperse the mixture substantially uniformly over the entire cross section of the casing 66. This combustible mixture passes through the apertured plate 72 across the open end 79 of the tube 76 into the effective igniting zone of the combination unit 73 which functions as a heat gun. In other words the heat developed by the coil 74 is projected outwardly from the open end 79 of the tube 76, with the heat generated being dependent upon the watt input to the resistance coil 74. The combustible mixture is thus ignited by virtue of the temperature at the end 79 of the tube 76 being of a degree capable of igniting such mixture without the mixture itself directly contacting the coil 74.

In one commercial embodiment of the invention the heating unit has an overall length of about 18 inches, with the combustion chamber having a diameter of about five inches. The overall weight of this unit is in the neighborhood of about 25 pounds so that it is readily and safely suspended from the trailer back wall 12 in a position near the top thereof and well above any windows or doors that may be provided therein without obstructing the windows or protruding at any great distance from the back wall. The relative assembly of the heating unit and its component parts in a housing means of substantially uniform shape and of a small size, eliminates any interference of the unit with the maneuverability of the trailer or movement of people about the trailer. Further, all of the space 9 within the vehicle may be completely utilized since provision need only be made therein for the air circulating fan 41 and associated motor 44. However, these parts are small relative to the space 9 within the trailer vehicle and are located near the top thereof so as to offer a minimum of interference with movement of people or the arrangement of any apparatus or material within the trailer space. This construction of the heater and its installation in the trailer are particularly advantageous where the trailer is used in field work, such as on construction jobs and in army signal corps work and the like. Thus for signal corps work the radio apparatus can be arranged over the entire space within the trailer. Since the heating unit is located to the outside of the trailer and the heated air delivered into the trailer space 9 at the top thereof, the apparatus, as well as the operators therefor, can be positioned anywhere in the trailer without being exposed to any intense local heat. Since the heating unit operates over prolonged periods of time with a minimum of attention, work within the trailer can be carried on practically without interruption. This of course is very important in army signal work where the operators may be continuously occupied over long periods of time with their signal duties. Further since the radio apparatus must be at an optimum temperature for most efficient operation, the trailer can be kept warm when such apparatus is not in use and the operators therefor are on leave. The apparatus is thus maintained at all times ready for instant use.

In the operation of the heater it is contemplated that the pump motor 61, the air supply fan motor 52 and the air circulating motor 44 be connected in a common circuit which is diagrammatically illustrated in Fig. 7. The circuit includes a socket or electric receptacle 82 electrically connected with the primary P of the transformer 53 and adapted for connection with a suitable source of power. The primary P is connected in parallel with the motors 44 and 52. The secondary S of the transformer 53 is connected in series with the resistance 74. In one embodiment of the invention the air in the chamber 29 is at a pressure of about 2 inches of water, and the resistance 74 is adapted to be operated at 6 volts. Trailers in a standby position usually have access to an electrical power supply of about 110 volts, which voltage in domestic trailers is provided from a high line in the usual trailer camps, and in trailers for field work from a suitable engine generator set. The transformer 53, therefor, is of step down type adapted to furnish a voltage of six volts to the resistance 74. The motors 44, 52 and 61 as shown in Fig. 7 are operated at 110 volts. The parallel circuit for the motor 44 is provided with a separate control switch 84 which is normally open. In the operation of the heating unit closing of the main switch 83 and control switch 84 energizes the three motors 44, 52 and 61 and the resistance coil 74. Stopping of heater operation is accomplished by opening both of these switches, with the closing of the switch 84 while the switch 83 is open serving to separately operate the motor 44 for a purpose which will be later fully explained.

Ventilating as well as heating of the trailer space 9 is accomplished by means including a valve or damper means indicated generally at 85 (Figs. 2 and 3) which includes a spider member 86 positioned transversely of the air duct 17 at the inlet end 22 thereof and to one side of the heating unit, the member 86 being secured to the housing 14 by means including the housing supporting screws 19. Extended through the duct 17 and back wall 12 of the trailer is an operating member 87 having a hand wheel 88 at one end within the trailer space 9 with the opposite end thereof in a swivel connection with a cover plate 89 operatively associated with an opening 90 in the duct 16. The opening 90 opens the duct 16 to the atmosphere. The operating member 87 is rotatably supported by and in threaded engagement with a threaded sleeve M carried in the housing wall 12. Thus on rotation of the hand wheel 88 the operating member 87 is axially moved to position the cover 89 relative to the opening 90 in a manner which is believed to be obvious.

On opening of the valve means 85 a portion of the air discharged by the fan 41 from the trailer space 9 is exhausted through the opening 90 in the air duct 16. Fresh make-up air is admitted into the space 9 by opening one of the windows 11 therein. Heating and ventilating of the space 9 are thus accomplished concurrently.

Ventilation only of the space 9 is provided by the operation of the damper means 85 relative to damper means 92 operatively associated with the outlet 23 of the duct 16 and located within the trailer. As illustrated in Fig. 2 the damper means 92 is of a usual type including a plurality of louvers 93 connected together for simultaneous operation by an actuating member 94 having a lever 96. As previously explained in connection with the control circuit of Fig. 7 the air circulating motor 44 may be operated independently of the remainder of the control circuit. Thus with the main switch 83 open and the control switch 84 closed the heating unit is rendered inoperative and the motor 44 alone is operated. With the fan 41 operated by the motor 44, and with the damper means 92 in a closed position and the damper means 85 in an open position, all of the air discharged by the fan 41 from the space 9 is exhausted through the opening 90. Fresh make-up air is admitted into the space 9 through the windows 11 so that such space is completely ventilated.

Where the trailer is used in army signal work or the like it may at times be exposed to conditions of actual combat such as a gas attack or the like. Under a condition of gas attack, it is desirable of course that the trailer space 9 be substantially air tight. Since the housing 14 is assembled completely to the outside of the trailer wall 12 the air passages 22 and 23 fluid connecting the space 9 with the air duct 16, and such duct must also be air tight. Gaskets 97 composed of a suitable resilient material are interposed between the housing side 21 and the trailer wall 12 at the securing means 19 and adjacent the passages 22 and 23 to seal the duct 16 at the passages 22 and 23. The sleeve member M for the operating member 87 is sealed at the wall 12 by a gasket 98 positioned thereabout and between the wall 12 and the housing side 21. The member M is formed with an annular flange 99 for engaging the hub portion 101 of the spider member 86 and is externally threaded at its opposite end, which extends within the trailer space 9, for engagement with a nut 102. On tightening of the nut 102 the flange 99 is drawn against the spider hub 101 which in turn clamps the gasket 98 between the housing side 21 and the wall 12, it being apparent that the tightening of the nut 102 draws the flange 99 and the nut 102 against the sides of the trailer wall 12.

The opening 90 in the air duct 16 is formed with a rimmed groove 103 adapted to receive therein a circular gasket 104. On closing of the valve means 85 the cover plate 89 is clamped against the gasket 104. By virtue of the screw action of the operating member 87, sufficient pressure is applied on the cover 89 to assure an air tight engagement thereof with the gasket 104. It is seen, therefore, that on closing of the damper means 85 the air duct 16 is completely air tight and also in air tight connection with the trailer space 9. As a result the trailer space 9 may be safely heated simply by closing the damper means 85.

It is apparent, of course, that the vents 51 in the air duct 16 supply only combustion air to the combustion chamber 24, which air is exhausted therefrom through the exhaust pipe 38 back to the atmosphere. This combustion air, therefore, is entirely out of contact with the air duct 16 so that any passage thereof into the trailer space 9 is completely eliminated. It is to be understood of course that the windows 11 which may be utilized at times as a part of the ventilating system for the trailer space 9 are also capable of being sealed in air tight engagement with their respective wall portions.

From a consideration of the above description and drawings, therefore, it is seen that the invention provides a heating and ventilating system for a trailer vehicle which is substantially completely located to the outside of the trailer and of an assembly providing for its installation in a minimum of space and in a position offering a minimum of interference to persons moving about the trailer, or to objects positioned within the trailer. The heating unit is self-contained and is capable of being operated immediately on connection thereof with a source of electrical power. Heating or ventilating or a combination thereof is readily obtainable by the manipulation of suitable adjustment portions located entirely within the trailer space 9. Further the heating unit may be made air tight relative to the trailer space so that the heating function can be continued even though fluid connection of the recirculated air with the atmosphere is entirely cut off.

Although the invention has been specifically described with reference to a preferred embodiment thereof it is to be understood that the parts thereof can be relatively arranged and modified so as to be within the full intended scope of this invention as defined by the appended claims.

I claim:

1. In a heating and ventilating system for a space within a mobile craft adapted to be carried on a wall portion for said space and to the outside thereof, a heating portion having a passage for air to be heated in thermal relation therewith, said passage having the ends thereof in fluid communication with said space, air moving means carried on said wall portion within said space and fluid connected with one end of said passage, with said one passage end having an opening therein to the atmosphere, damper means located within the passage at said one end operatively associated with said opening, and an actuating member for said damper means extended through said wall portion for manipulation from within said space to selectively discharge unheated air from said passage.

2. In a heating and ventilating system for a space within a mobile craft having a wall portion, a housing supported on the outside of said wall portion divided longitudinally into two air ducts, with one of said ducts having the opposite ends thereof in fluid communication with said space, a combustion portion located in said one duct, electrical air moving means carried on said wall portion within said space and located at one end of said one duct to circulate air therethrough and about said combustion portion to be heated, said one end of the one duct having an opening therein to the atmosphere, damper means operatively associated with said opening to by-pass a portion of the unheated air from said one duct to the atmosphere, an actuating portion for said damper means located within said space, electrical means for supplying air to said combustion portion located in the other one of said two ducts, means fluid connecting said air supply means with said combustion portion, said other duct being in fluid communication with the atmosphere, a fuel supply for said combustion portion including a fuel tank, electrical means for pumping the fuel from said tank to said combustion portion, and an energizing circuit for said defined electrical means including a socket portion adapted for connection with a source of electrical power.

3. A heating and ventilating system for a space within a mobile craft having a wall portion, a housing carried on the outside of said wall portion having an inlet and an outlet in fluid communication with said space, air moving means at said inlet for circulating air from said space through said housing, a heating unit within said housing for heating the air circulated therethrough, said housing having an opening therein to the atmosphere near said inlet, damper means at said opening for by-passing a portion of the air from said housing to the atmosphere including an operating portion located within said space, other damper means operatively associated with said outlet for controlling the passage of air from said housing into said space, means for admitting atmospheric air into said space, and means selectively providing for the separate and concurrent operation of said heating unit and air moving means.

4. A heating and ventilating system for the compartment in a trailer vehicle having a wall portion, a housing supported on said wall portion outside of said compartment having an inlet and an outlet in fluid communication with said compartment, means air sealing said inlet and outlet with said wall portion, air moving means at said inlet for circulating air from said compartment through said housing, a heating unit located in said housing for heating the air circulated therethrough, said housing having an opening therein to the atmosphere near said inlet, damper means including a cover portion operatively associated with said opening for by-passing a portion of the air from said compartment to the atmosphere, a supporting member for said cover movably carried in said wall portion and having an operating portion located within said compartment, with actuation of said operating portion moving said cover relative to said opening, means air sealing said supporting member relative to said wall portion, and means providing for the air sealing of said cover with said opening when said cover is in closing position.

5. In a heating system for a space in a mobile craft having a rear wall portion, housing means supported on said wall portion near the top thereof and to the outside of said space, said housing means having a pair of longitudinally extending air ducts therein, one of said air ducts having the ends thereof in fluid communication with said space, a combustion portion in said one duct, air moving means located in said space at one end of said one duct for circulating air to be heated about said combustion portion, other air moving means for supplying combustion air to said combustion portion located in the other of said ducts, said other duct having openings therein to the atmosphere, a motor for driving said other air moving means located in said other duct, and a fuel system for supplying fuel to said combustion portion including pumping means and a fuel tank carried on said wall portion adjacent said housing means.

6. A heating system for a space within a mobile craft adapted to be operated independently of the motive power for such craft, a wall portion for said space, a housing supported on the outside of said wall portion having a pair of adjacent longitudinally extending air ducts therein, with one of said ducts having the opposite ends thereof in fluid communication with said space, a combustion portion located in said one duct, electrical air moving means carried on said wall portion within said space at an end of said one duct to circulate the air to be heated through said one duct and about said combustion portion, air and fuel mixing means within said one duct for preparing a combustible mixture for burning in said combustion portion, other electrical air moving means positioned in the other of said air ducts for supplying air to said air and fuel mixing means, said other duct having an opening therein to the atmosphere, electrical means for supplying fuel to said air and fuel mixing means, electrical means for heating said air and fuel mixing means to at least a fuel vaporizing temperature to vaporize the fuel therein for mixing with the air, and an energizing circuit for all of said defined electrical means including a socket portion adapted for connection with a source of electrical power.

7. In a heating and ventilating system for a space within a mobile craft having a wall portion, a housing supported on the outside of said wall portion having a pair of longitudinally extending air ducts therein, with one of said ducts having the opposite ends thereof in fluid communication with said space, a combustion portion located in said one duct, electrical air moving means carried on said wall portion within said space and located at one end of said one duct to circulate air therethrough and about said combustion portion to be heated, electrical means including a fan and a driving motor for supplying air to said combustion portion located in the other of said two ducts, said other duct having an opening therein adapted to receive said electrical means therethrough, a cover for said opening detachably secured to said housing, and means for securing said electrical means to said cover for removal and assembly therewith relative to the housing as a complete unit.

8. In a heating system for a space in a mobile craft having a wall portion, said system including housing means supported on said wall portion to the outside of said space, said housing means having a pair of longitudinally extending air ducts therein, with one of said air ducts having the ends thereof in fluid communication with said space, a combustion portion in said one air duct for heating the air circulated therethrough, means within said space for circulating air through said one duct, an air and fuel mixing portion operatively associated with said combustion portion, an air chamber for supplying combustion air to said mixing portion having an enclosing wall carried on said combustion portion and extended longitudinally thereof, with said mixing portion being located within said air supply chamber, means for supplying air to said air chamber positioned in said second air duct, said second air duct having openings therein to the atmosphere, a fuel system for supplying fuel to said mixing portion, and electrical heating means in said mixing portion for heating the same to at least a fuel vaporizing temperature to mix together the air and fuel therein for burning in said combustion portion.

9. In combination with a wall provided with an opening therethrough, a housing supported upon one side of said wall and defining a chamber having an inlet in communication with the other side of said wall through said opening and an outlet in communication with said other side of said wall through a second opening in said wall, said housing comprising two spaced apart panels one of which is adjacent said one side of said wall, said wall and said panels having aligned openings therethrough, adjustable damper means coperating with the opening in the other of said panels and provided with an adjusting element extending through the aligned openings in said wall and said one panel, and means for air sealing the openings in said panels when said damper means is operated to close the opening in said other panel.

10. In combination with a wall provided with an opening therethrough, a housing supported upon one side of said wall and defining a chamber having an inlet in communication with the other side of said wall through said opening and an outlet in communication with said other side of said wall through a second opening in said wall, said housing comprising two spaced apart panels one of which is adjacent said one side of said wall, said wall and said panels having aligned openings therethrough, adjustable damper means cooperating with the opening in the other of said panels and provided with an adjusting element extending through the aligned openings in said wall and said one panel, means for air sealing the opening in said other panel when said damper means is operated to close the opening in said other panel, a gasket interposed between said wall and said one panel and surrounding said adjusting element, and means carried by said adjusting element for clamping the zone of said one panel which surrounds the opening therethrough against said gasket when said damper means is operated to close the opening in said other panel, thereby to air seal the opening through said one panel.

11. A heating and ventilating unit comprising a housing provided with a partition which divides the interior of the housing into two compartments one of which acts as an air circulating chamber, an internal combustion heater located in said one compartment and provided with means defining a combustion chamber, said partition being provided with an opening therethrough for admitting air from the other of said compartments to said combustion chamber, the wall of said housing which defines said other compartment being provided with an opening therethrough for admitting atmospheric air to said other compartment, air moving means including a fan and a driving motor for transmitting atmospheric air through said openings to said combustion chamber, the wall of said housing which defines said other compartment having an opening therein for receiving said air moving means, a cover for said last-named opening detachably secured to said housing, and means for securing said air moving means to said cover for removal and assembly therewith relative to the housing as a complete unit.

HARRY B. HOLTHOUSE.